United States Patent [19]

Knepler

[11] Patent Number: 5,422,976
[45] Date of Patent: Jun. 6, 1995

[54] BOILER CONTROL SYSTEM WITH STEAM SENSOR THERMALLY ISOLATED FROM A WATER RESERVOIR

[75] Inventor: John T. Knepler, Chatham, Ill.

[73] Assignee: Bunn-O-Matic Corporation, Springfield, Ill.

[21] Appl. No.: 223,971

[22] Filed: Apr. 6, 1994

[51] Int. Cl.⁶ ............................ H05B 1/02; F24H 1/20
[52] U.S. Cl. ................................... 392/451; 126/361; 122/13.2
[58] Field of Search ........................ 392/449–454; 126/361, 374; 122/13.2

[56] References Cited

U.S. PATENT DOCUMENTS

| | | | |
|---|---|---|---|
| 4,354,094 | 10/1982 | Massey et al. | 292/451 |
| 4,582,025 | 4/1986 | Grasso | 122/504 |
| 4,722,321 | 2/1988 | Meister | 99/474 |
| 5,019,690 | 5/1991 | Knepler . | |
| 5,038,752 | 8/1991 | Anson . | |

Primary Examiner—John A. Jeffery
Attorney, Agent, or Firm—Trexler, Bushnell, Giangiorgi & Blackstone, Ltd.

[57] ABSTRACT

A boiling water control system for use with a boiling water dispensing apparatus. The boiling water dispensing apparatus includes a water reservoir having a water heating element retained therein for heating water. A top portion of the reservoir is divided into a first and second section. The reservoir includes an inlet for emitting water and an outlet for dispensing water. The boiling water control system includes a steam sensor which produces a control signal in the presence of steam. A control module is associated with the boiling water apparatus and coupled to the steam sensor and the heating element for activating and deactivating the heating element in response to the control signal produced by the steam sensor. A primary steam vent communicates with the first section of the reservoir for allowing steam and air to escape from the first section. An air vent is provided on the primary steam vent for removing heated air from the primary steam vent. Steam travels through the primary steam vent to the steam sensor to produce an accurate temperature reading of the water retained in the reservoir.

14 Claims, 1 Drawing Sheet

BOILER CONTROL SYSTEM WITH STEAM SENSOR THERMALLY ISOLATED FROM A WATER RESERVOIR

BACKGROUND

The present invention relates to hot water dispensing apparatus, and more particularly a boiling water dispenser capable of maintaining and dispensing large quantities of water at boiling temperature.

It is often desirable for restaurant and other institutional food service applications to have a source of hot water for various cooking purposes, such as preparation of pastas, potatoes, gravies, soups and similar dishes. A constantly available source of heated water, available at near-boiling temperatures on demand is also useful for cleaning purposes. A variety of water heating and dispensing apparatus have been devised to satisfy these applications.

A typical hot water dispenser includes a reservoir in which water is heated by a heating device. A control system senses and maintains the water in the reservoir at a desired temperature. Control systems typically include a temperature sensing probe to monitor the temperature of the water in the reservoir and a level sensing probe to monitor the volume of water retained in the reservoir. Examples of heated water dispensers can be found in U.S. Pat. No. 5,019,690 to Knepler and U.S. Pat. No. 5,038,752 to Anson.

The device in the Knepler '690 patent includes a steam sensing unit which senses the temperature of steam which evolves from the heated water-reservoir. The steam serving unit is position to receive steam from a steam discharge tube which communicates with the reservoir. Steam passes from the reservoir through the tube and exits the tube at the steam sensing unit. A steam sensor of the steam sensing unit is coupled to a control system to activate and deactivate the heating element in response to steam exiting the tube. The steam sensor, coupled with the control unit, maintains the water retained in the reservoir within a desired temperature range.

The Anson '752 patent shows a novel steam sensor mounting structure which facilitates positioning of a steam sensor so as to be responsive to the presence and absence of steam vented from the reservoir of the heated water dispensing apparatus. The sensor mounting structure thermally insulates the sensor from the water reservoir and permits free access of ambient air to the sensor in the absence of venting steam.

The teachings of the Knepler '690 patent are very successful when operating with a tank capacity of approximately five gallons. When the structure of Knepler '690 is employed with a heated water dispensing apparatus having a capacity of ten gallons or more, certain performance parameters may not be satisfied. One problem that may arise with a larger volume of water is that the heating element may prematurely deactivate. The heating element may tend to deactivate when the water in the reservoir is approximately 200 degrees fahrenheit. After a period of time the heating element is once again activated to further heat the water to an acceptable temperature.

After considerable study and research of this problem it has been found that when cold water is heated, air which is otherwise dissolved in the water, comes out of the solution and rises to the top surface whereupon it escapes to the ambient atmosphere. The evolution of gas from solution becomes more rapid as the water temperature increases towards the boiling point. The air escaping from solution is heated although it is not yet heated to boiling temperature or formed steam. Since the escaping air is heated it tends to rush out through the steam discharge tube and past the steam sensor. The volume of heated air in the larger capacity system is sufficient to affect the temperature sensed by the steam sensor to the point where the sensor indicates that the water is at boiling temperature when, in fact, this is not the case.

The ten gallon tank, due to its increased capacity, has a larger interior volume than the five gallon tank and is typically designed to be deeper and have a larger top surface area than the five gallon tank. As a result of the dimensional differences between the ten gallon reservoir and the five gallon reservoir, and the substantially large volume retained therein, a sufficient quantity of heated air flows across the steam sensor thereby prematurely deactivating the heating element.

For the forgoing reasons, there is a need for an apparatus which has a substantially larger heated water volume capacity which employs a novel and non-obvious boiling water control system to maintain the temperature of the water retained in the reservoir at or near the boiling temperature for water.

OBJECTS AND SUMMARY

A general object of the present invention is to provide a boiling water control system for use with large capacity heated water reservoirs to maintain the temperature of the water retained therein at or near the boiling temperature for water.

Another object of the present invention is to provide a steam activated boiling water control system for large capacity heated water dispensing apparatus which is configured to sense the temperature of steam once the water in the reservoir reaches boiling temperature.

Yet another object of the present invention is to provide a boiling water control system which prevents premature deactivation of the heating element used to heat the water retained in the reservoir.

Briefly, and in accordance with the foregoing, the present invention envisions a boiling water control system for use with a boiling water dispensing apparatus. The boiling water dispensing apparatus includes a water reservoir having a water heating element retained therein for heating water. A top portion of the reservoir is divided into a first and second section. The reservoir includes an inlet for emitting water and an outlet for dispensing water. The boiling water control system includes a steam sensor which produces a control signal in the presence of steam. A control module is associated with the boiling water apparatus and coupled to the steam sensor and the heating element for activating and deactivating the heating element in response to the control signal produced by the steam sensor. A primary steam vent communicates with the first section of the reservoir for allowing steam and air to escape from the first section. An air vent is provided on the primary steam vent for removing heated air from the primary steam vent. Steam travels through the primary steam vent to the steam sensor to produce an accurate temperature reading of the water retained in the reservoir.

BRIEF DESCRIPTION OF THE DRAWINGS

The organization and manner of the structure and operation of the invention, together with further objects and advantages thereof, may be understood by reference to the following description taken in connection with the accompanying drawings, wherein like reference numerals identify like elements, and in which.

DETAILED DESCRIPTION OF THE PREFERRED EMBODIMENT

Figure 1:
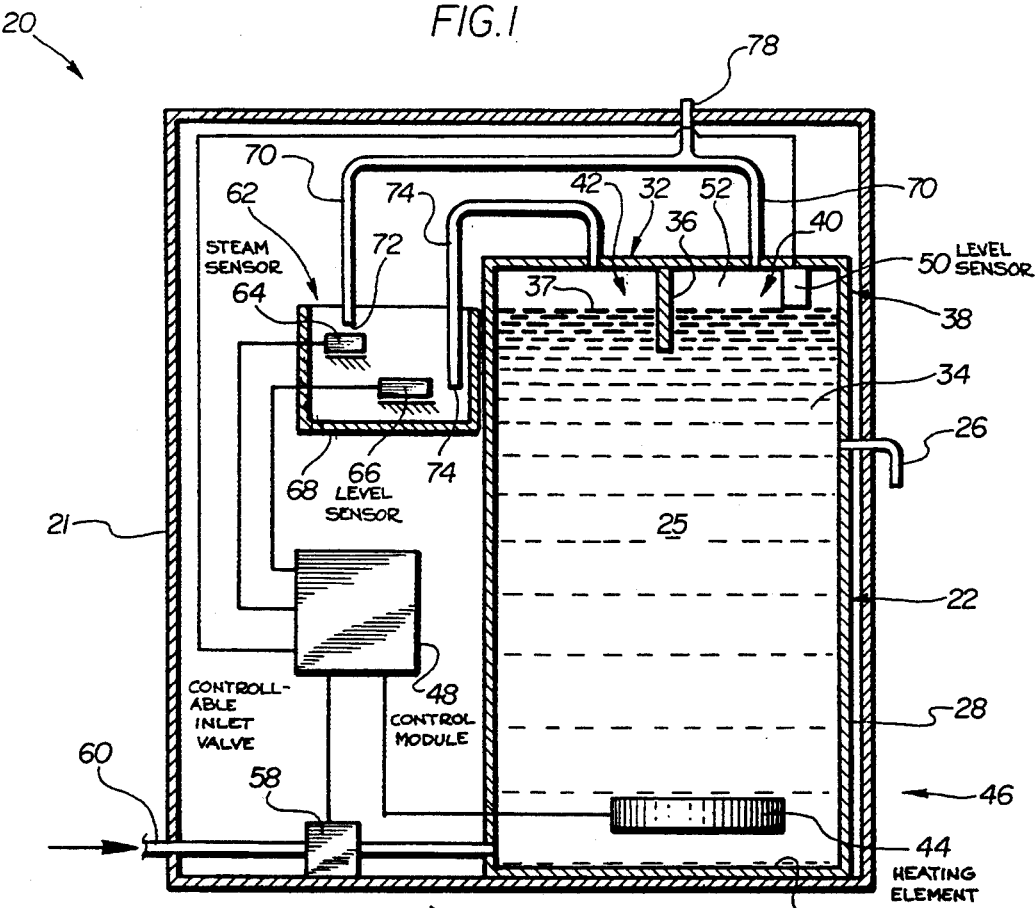
FIG. 1 is a diagrammatic illustration of a large capacity boiling water dispenser including a boiling water control system constructed in accordance with the present invention.

While the invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

The general diagrammatic representation of FIG. 1 shows a boiling water dispensing apparatus 20 having a body 21 housing a water reservoir 22 having an inlet 24 communicating therewith to introduce water 25 into the reservoir 22 and an outlet 26 to dispense water therefrom. The reservoir 22 includes sidewalls 28, a bottom 30 and a top 32. The space between the sidewalls 28, bottom 30 and top 32 define a reservoir cavity 34. A baffle 36 is attached to the top 32 and extends downwardly into a top portion 38 of the reservoir 22 dividing the volume and surface 37 of the top portion 38 into a first section 40 and a second section 42.

Water retained in the reservoir 22 of the boiling water dispenser 20 is heated by the heating means or heating element 44 which is generally located in a bottom portion 46 of the reservoir 22. Control means or control module 48 is coupled to the heating element 44 to regulate the activation and deactivation of the heating element 44. A level sensor 50 is positioned in the top portion 38 for sensing a predetermined desired level in the reservoir 22 and to maintain an air gap 52 between the surface 37 of the water retained in the reservoir and the inside surface 56 of the top 32. The level sensor 50 is coupled to the control module 48. The boiling water dispenser 20 as shown in the general diagrammatic view of FIG. 1 includes a controllable inlet valve 58 which is connected to a water inlet feedline 60. The controllable valve 58 is coupled to the control module 48.

The boiling water dispenser 20 further includes means for detecting steam or a steam sensing unit 62 which is responsive to the presence of boiling water in the reservoir 22. The steam sensing unit 62 includes a steam sensor 64 and a level sensor 66 retained in a collection container 68. A primary steam vent 70 communicates with the first section 40 of the water reservoir 22 and provides a conduit through which steam travels. A distal end 72 of the primary steam vent 70 is positioned proximate to the steam sensor 64. A secondary steam vent 74 communicates with the second section 42 to allow steam developed in the second section 42 to escape from the reservoir 22 into the collection container 68. An exhaust end 76 of the secondary tube 74 is spaced away from the steam sensor 64 to prevent steam escaping therethrough from corrupting the steam temperature sensed by steam sensor 64.

The level sensor 66 is provided in the collection container 68 to sense the water level in the container 68 and produce a signal sensed by the control module 48. The control module 48 will deactivate the dispenser 20 if the signal falls outside acceptable operating parameters. For example, if the reservoir 22 overflows through the primary and/or secondary steam vents 70, 74 or if steam condenses and accumulates in the container 68 to an undesired level, the level sensor 66 signal will fall outside of acceptable parameters and in response the control module 48 will deactivate the heating means 44 to prevent further accumulation of water in the collection container 68.

The top portion 38 of the reservoir 22 is divided by the baffle 36 to provide the first and second sections 40, 42. The baffle 36 may be positioned along the top 32 to achieve the desired volumes or surface 37 areas for the first and second sections 40, 42. When water retained in the reservoir 22 is heated by the heating means 44, air dissolved in the solution evolves and rises to the surface. As heated air 77 accumulates in the gap 52, and as the rate of heated air evolution increases, the heated air 77 is forced out through the primary vent 70. The heated air 77 in the second section 42 passes through the secondary vent tube 74 and into the collection container 68. Steam passing through the secondary vent tube 74 condenses in the collection container 68 and evaporates. The steam 79 which eventually develops in the first section 40 passes through the primary steam vent 70 to the collection container 68 whereupon it is discharged from the distal end 72 onto the steam sensor 64

It should be noted that the steam sensor 64 is thermally isolated from the reservoir 22 so that the heat radiated from the reservoir 22 will not affect the temperature reading of the steam discharged onto the steam sensor 64. Additionally, the collection container 68 is in close thermal contact with the reservoir 22 to facilitate evaporation of condensate.

Figure 2:
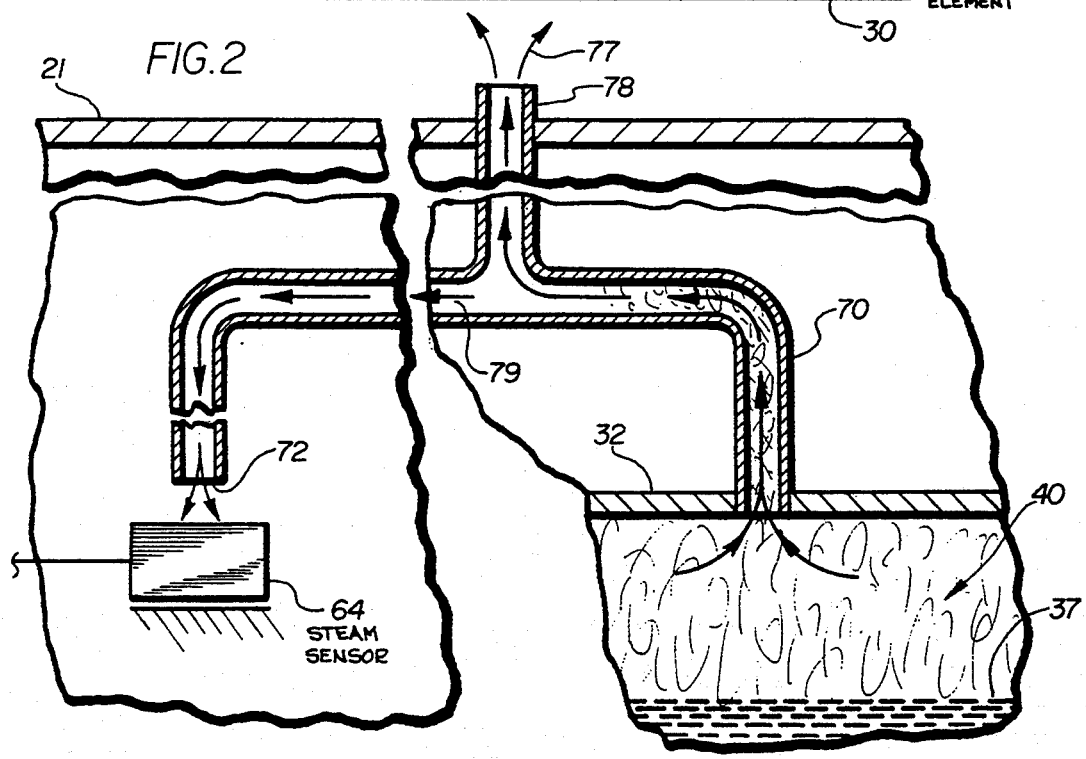
FIG. 2 is an enlarged, partial fragmentary, cross-sectional view of a primary steam vent as in FIG. 1 showing the flow path of heated air and steam through the primary steam vent.

Initially during the heating process, the heated air 77 escapes through the primary steam vent 70 (see FIG. 2). An air vent 78 communicates with the primary steam vent 70 for bleeding off the lower density heated air 77 from the primary steam vent 70. The air vent 78 is positioned on an elevated portion 80 of the primary steam vent 70 to take advantage of the rising of the lower density heated air 77. By venting the heated air through the air vent 78, the heated air 77 goes not affect or corrupt the temperature reading at the steam sensor 64.

As the heating process continues, the heated water in the reservoir begins to generate steam 79. The steam 79 accumulates in the gap 52 and eventually flows into the primary vent 70. The higher density steam 79 will not tend to rise into the air vent 78 and will have sufficient momentum to continue to flow along the generally horizontal path to the steam sensor 64. By removing the heated air, the temperature sensed by the steam sensor 64 is a more accurate temperature of the water retained in the reservoir. The accuracy is a result of sensing only the temperature of the steam and not the heated air which would otherwise corrupt the sensor 64 reading.

In use, water 25 is retained in the water reservoir 22 and maintained at a heated temperature. The temperature of the water is set to be maintained within a desired temperature range which is monitored and controlled by the control module 48. The level sensor 50 monitors the level of the surface 37 of the water such that when a sufficient quantity of water has been dispensed through the outlet 26, the control module 48 will activate the controllable inlet valve 58 to dispense water into the reservoir 22 through the inlet 24. The added water is heated by the heating element 44 which is activated by the control means 48 in response to the addition of water to the water reservoir 22. As water is fed through the inlet 24, the surface 37 rises to a point where the level sensor 50 senses a "full" reservoir condition. When the full condition is sensed by the control module 48, the control module 48 controls the inlet valve 58 to stop the flow of water through the inlet 24.

As the unheated water is heated by the heating element 44, initially, the water tends to expand and air dissolved in and the water comes out of the solution and rises to the top surface 37 where it accumulates in the air gap 52 in the first and second sections 40, 42. The heated air 77 flows from the first section 40 to the primary vent 70 where it rises into the air vent 78 to escape to the ambient atmosphere. The steam 79 which collects in the first section 40 passes through the primary steam vent 70 and into the container 68 a distance away from the steam sensor 64. The steam 79 which collects in the second section 42 passes through the secondary steam vent 74 and into the collection container 68.

The lighter density heated air 77 passing through the primary steam vent 70 rises through the air vent 78, resulting in only the steam 79 being exhausted through the distal end 72 of the primary steam vent 70. The steam 79 delivered to the steam sensor 64 provides an accurate temperature reading of the heated water 25 in the reservoir 22.

While a preferred embodiment of the present invention is shown and described, it is envisioned that those skilled in the art may devise various modifications of the present invention without departing from the spirit and scope of the appended claims. The invention is not intended to be limited by the foregoing disclosure.

The invention claimed is:

1. A boiling water dispensing apparatus comprising:
   a water reservoir;
   means for heating water operatively associated with said water reservoir;
   a baffle disposed in said reservoir for dividing at least an upper portion of said reservoir into a first and second section;
   an inlet communicating with said reservoir for admitting water into said reservoir;
   an outlet communicating with said reservoir for dispensing water from said reservoir;
   means for detecting steam responsive to the presence of boiling water in said reservoir for producing a control signal indicative thereof, said steam detecting means being generally thermally isolated from said water reservoir for preventing the temperature of the reservoir from affecting said steam detecting means;
   means for regulating the temperature of the water retained in the reservoir operatively associated with said water heating means, said temperature regulating means responsive to said control signal for activating and deactivating said water heating means to maintain water in said reservoir in a substantially boiling condition;
   a primary steam vent communicating with said first section of said reservoir and positioned relative to said steam detecting means for delivering steam from said first section of said reservoir to said steam detecting means; and
   an air vent communicating with said primary steam vent for exhausting heated air from said primary steam vent.

2. A boiling water dispensing apparatus as recited in claim 1, further comprising a secondary steam vent communicating with said second section of said reservoir for exhausting heated air and steam from said second section of said reservoir.

3. A boiling water dispensing apparatus as recited in claim 2, in which an exhaust end of said secondary steam vent is spaced away from said steam detecting means for preventing the steam exhausted therethrough from affecting said steam detecting means.

4. A boiling water dispensing apparatus as recited in claim 2, further including a receptacle positioned exteriorly of said reservoir for collecting condensate and water discharged from said reservoir through said primary and secondary steam vents.

5. A boiling water dispensing apparatus as recited in claim 1, wherein said air vent is disposed on an elevated portion of said primary steam vent.

6. A boiling water dispensing apparatus comprising:
   a water reservoir, said reservoir having a top portion thereof defining a first and second section, an inlet communicating with said reservoir for admitting water into said reservoir, and an outlet communicating with said reservoir for dispensing water from said reservoir;
   means for heating water operatively associated with said water reservoir;
   means for detecting steam from said reservoir responsive to the presence of steam and producing a control signal indicative thereof, said steam detecting means being generally thermally isolated from said water reservoir;
   a primary steam vent having a first end communicating with said first section of said reservoir and a second end positioned relative to said steam detecting means for delivering steam from said first section of said reservoir to said steam detection means;
   an air vent depending from and communicating with said primary steam vent being positioned between said first and second ends of said primary steam vent for exhausting heated air from said primary steam vent; and
   means for controlling said boiling water dispensing apparatus, said control means coupled with said water heating means and responsive to said control signal for activating and deactivating said water heating means to maintain water in said reservoir in a substantially boiling condition.

7. A boiling water dispensing apparatus as recited in claim 6, further comprising a level sensor operatively associated with said reservoir and coupled with said control means for sensing the level of water in said reservoir.

8. A boiling water dispensing apparatus as recited in claim 6, further comprising a controllable valve operatively associated with said inlet and coupled with said control means for controllably admitting water to said reservoir.

9. A boiling water dispensing apparatus as recited in claim 6, further comprising a receptacle positioned exteriorly of said reservoir for collecting condensate and water discharged from said reservoir through said primary steam vent.

10. A boiling water dispensing apparatus as recited in claim 9, further comprising a level sensor said in receptacle operatively associated with said reservoir for sensing the level of water and condensate which accumulates in said receptacle.

11. A boiling water control system for use with a boiling water dispensing apparatus, said dispensing apparatus having a water reservoir defining an upper surface of water in said reservoir, said reservoir having top means segregating at least one reduced surface area section from the remainder of said upper surface of water in said reservoir, an inlet for admitting water into said reservoir, an outlet for dispensing water from said reservoir and water heating means operatively associated with said water reservoir for heating water retained in said reservoir; said boiling water control system comprising: steam detecting means producing a control signal in the presence of steam, said steam detecting means being generally thermally isolated from said reservoir; a steam vent communicating with said at least one reduced surface area section of said reservoir and positioned for delivering steam from said reduced surface area section to said steam detection means; and means for controlling said boiling water dispensing apparatus coupled with said water heating means and responsive to said control signal for activating and deactivating said water heating means to maintain water in said reservoir in a substantially boiling condition.

12. A boiling water control system as recited in claim 11, further comprising an air vent extending from said steam vent for exhausting heated air from said reduced surface area section of said reservoir.

13. A boiling water dispensing apparatus, said dispensing apparatus comprising: a water reservoir, said reservoir having a top portion defining a first reduced surface area section segregated from a second surface area section; an inlet for admitting water into said reservoir; an outlet for dispensing water from said reservoir; water heating means operatively associated with said water reservoir for heating water retained in said reservoir; steam detecting means producing a control signal in the presence of steam, said steam detecting means being generally thermally isolated from said reservoir; a first steam vent communicating with said first surface area section of said reservoir and positioned for delivering steam from said first surface area section to said steam detection means; and means for controlling said boiling water dispensing apparatus coupled with said water heating means and responsive to said control signal for activating and deactivating said water heating means to maintain water in said reservoir in a substantially boiling condition; and a second steam vent communicating with said second surface area section.

14. A boiling water control system as recited in claim 13, further comprising an air vent extending from said first steam vent for exhausting heated air from said first surface area section.

* * * * *

UNITED STATES PATENT AND TRADEMARK OFFICE
CERTIFICATE OF CORRECTION

PATENT NO.   : 5,422,976
DATED        : June 6, 1995
INVENTOR(S)  : John T. Knepler It is certified that error appears in the above-indentified patent and that said Letters Patent is hereby corrected as shown below:

Column 1, Line 33    "serving"    should read -- sensing --

Column 4, Line 50    "goes not"   should read --does not --

Signed and Sealed this

Twelfth Day of September, 1995

Attest:

BRUCE LEHMAN

Attesting Officer

Commissioner of Patents and Trademarks